United States Patent [19]
Wolfe et al.

[11] Patent Number: 4,899,645
[45] Date of Patent: Feb. 13, 1990

[54] SOLAR POWERED VENTILATOR

[75] Inventors: Philip R. Wolfe, Penn; John K. Callaghan, Wendover; Simon Pidgeon, Tunbirdge Wells, all of England

[73] Assignee: Intersolar Ltd., United Kingdom

[21] Appl. No.: 202,351

[22] Filed: Jun. 3, 1988

[30] Foreign Application Priority Data

Oct. 17, 1987 [GB] United Kingdom ............... 8724384

[51] Int. Cl.⁴ ........................................... B60H 1/24
[52] U.S. Cl. .................................... 98/2.02; 98/2.13; 98/94.1; 98/900
[58] Field of Search ................. 98/2, 2.02, 2.12, 2.13, 98/2.18, 94.1, 900

[56] References Cited

U.S. PATENT DOCUMENTS

| | | | |
|---|---|---|---|
| 2,612,830 | 10/1952 | Kendrick | 98/2.02 |
| 2,797,631 | 7/1957 | Davis | 98/40.24 X |
| 3,057,283 | 10/1962 | Mashburn | 98/2.13 X |
| 4,222,318 | 9/1980 | Patton et al. | 98/94.1 |
| 4,432,273 | 2/1984 | Devitt | 98/29 |
| 4,558,634 | 12/1985 | Oshiro et al. | 98/400 X |
| 4,680,815 | 7/1987 | Hirsch et al. | 2/171.3 |

FOREIGN PATENT DOCUMENTS

| | | | |
|---|---|---|---|
| 3624291 | 1/1988 | Fed. Rep. of Germany | 98/2.13 |
| 911302 | 11/1962 | United Kingdom . | |
| 2119499 | 11/1983 | United Kingdom . | |

Primary Examiner—Harold Joyce
Attorney, Agent, or Firm—Martin LuKacher

[57] ABSTRACT

A solar ventilator (1) is fittable to an edge (2) having first and second sides corresponding to first and second regions. The edge can be of a barrier, e.g. of a movable window of a motor vehicle or of a building. The ventilator has a suspension (5) for suspending the ventilator from the edge so that the ventilator will be adjacent the first region. The ventilator has a housing (4) having inlet and outlet portions (11,12) for enabling air to be transferred therebetween from a region to the other region. A fan (13) is comprised by the housing so as to enable the transfer of air. A solar generator (15) drives the fan. The ventilator may be arranged for direct or indirect reception of solar radiation.

13 Claims, 4 Drawing Sheets

SOLAR POWERED VENTILATOR

Investigations have been made to ventilate a motor car by providing a solar powered ventilator (i.e. a solar ventilator). The investigations incorporated a solar panel into the roof of the car, with the corresponding fan being part of a normal air conditioning system for the car. The solar panel and ventilation fan require electrical and/or mechanical connection to the car, the car has to be modified, and loss of security of the car may be introduced.

Investigations have also been made to ventilate other locations (e.g. rooms or buildings) by providing solar ventilators. Those ventilators require the location's outside barrier (e.g. wall or roof) to be modified by providing a hole to accommodate the ventilator or facilitate the necessary air flow.

It has now been found in accordance with the present invention that a solar ventilator can be provided for fitting to an edge of a movable window of a motor vehicle, e.g. a downwardly/upwardly movable window. The fitting is simple and utilises normal closing or opening actions of the window. However, in general, it has been found that a solar ventilator can be fitted to any suitable edge (e.g. a movable edge of a barrier) whether or not the edge belongs to a window or a motor vehicle. The ventilator does not require any external electrical connection, and does not require a vehicle, or other location, to which the ventilator is fitted, to be modified to allow provision of the ventilator.

A first aspect of the invention provides a solar ventilator for fitting to an edge, the ventilator comprising:

suspension means for suspending the ventilator from the edge so that the ventilator will be adjacent a first region corresponding to a first side of the edge; housing means having at least one inlet and at least one outlet, the at least one inlet being adapted to receive air from the first region, the at least one outlet being adapted to discharge to a second region, corresponding to a second side of the edge, the received air (or the at least one inlet and the at least one outlet act vice versa);

fan means comprised by the housing means so as to enable said reception and discharged of air; and solar generator means for driving the fan means in response to solar radiation.

A second aspect of the invention provides an edge, comprising at least one solar ventilator of the first aspect of the invention.

The invention may be embodied in any suitable manner, depending on the nature of the edge. Some examples of edges are edges on barriers, for instance a movable window of a motor vehicle or of a building. Preferably, the solar ventilator is an integral unit.

The suspension means may be laterally extendable for a variety of sizes of windows or of other barriers. The suspension means may comprise specially formed end profiles and telescopic mounting members. The suspension means may comprise first and second extension means respectively adjustably projectable from corresponding first and second sides of the suspension means, those sides corresponding to first and second sides of e.g. the top of a window. At least one portion of the suspension means may be constituted by the housing means optionally comprising at least one abutment for abutting or otherwise mounting on said edge, e.g. the housing means may comprise an overhang portion for acting as a said abutment. At least one portion of the suspension means may be adapted to engage at least one optional engaging portion of a frame or other means adjacent said barrier, and the housing means may constitute the suspension portions(s). The housing means may comprise at least one projection corresponding to at least one optional recess in a said frame or the like (e.g. a window frame of a building or a window frame comprised by a motor vehicle), the at least one projection being receivable by the at least one recess.

Preferably, the fan means is contained within the housing means. Some examples of fan means are a rotary fan or a longitudinal fan.

The solar generator means may comprise at least one photovoltaic generator, which may comprise at least one photovoltaic cell or member, e.g. as a panel (for instance constituting an array) or as a deposition on the inner or outer surface of a window. In general, a photovoltaic generator may be adapted and arranged to allow direct and/or indirect reception of solar radiation. For direct reception, at least one photovoltaic generator may be outside e.g. a window, so as to be adjacent the outer face region of the window and/or be adjacent an outer portion of the suspension means, for instance be associated with said overhang portion of the suspension means.

In the accompanying drawings, which are given by way of example of the invention;

Figure 1:
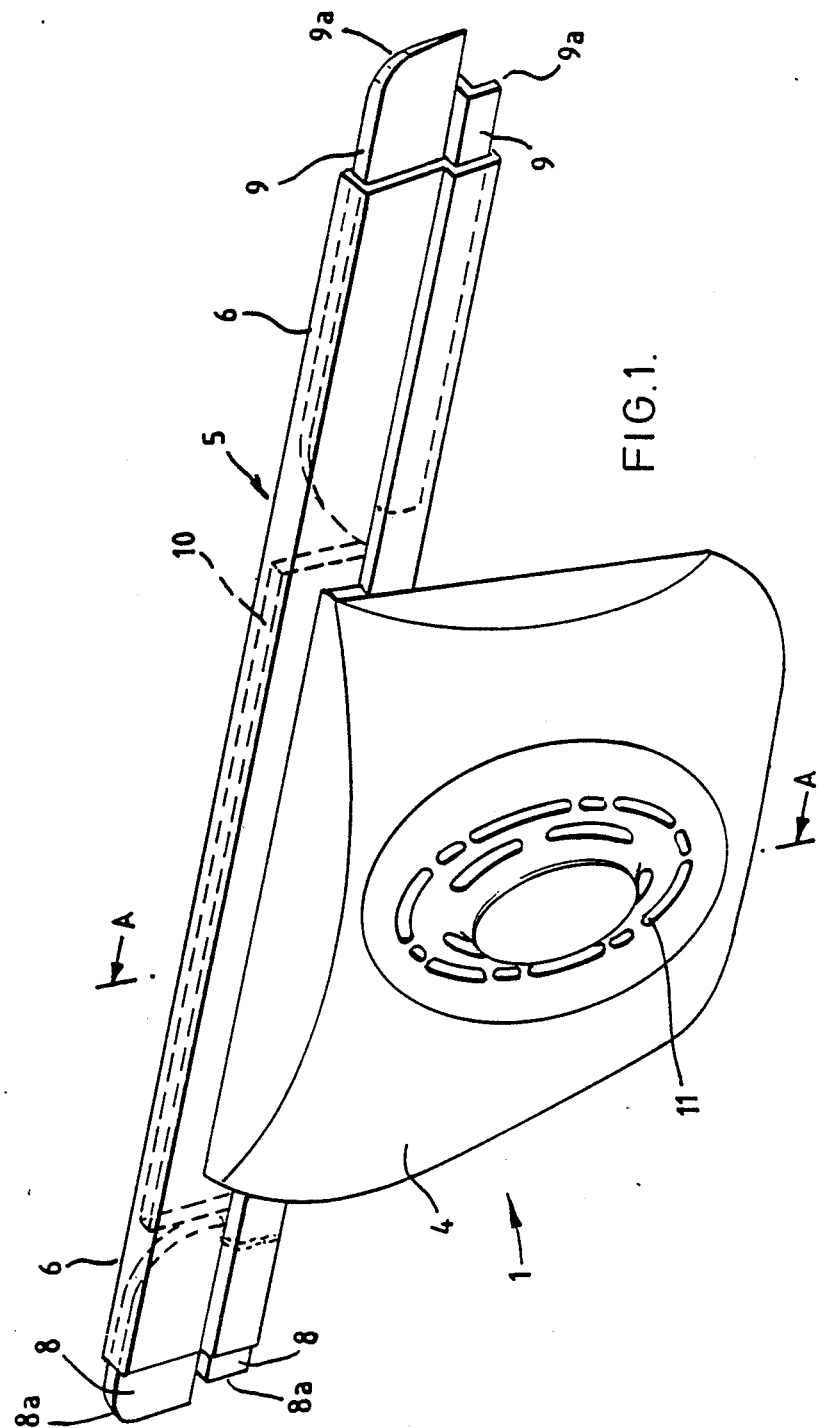
FIG. 1 is a perspective view of a solar ventilator.
Figure 2:
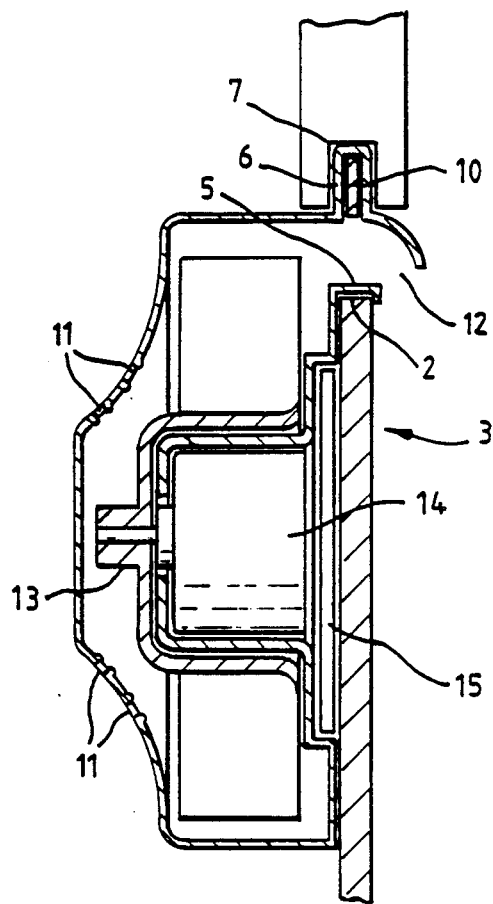
FIG. 2 is a cross sectional view corresponding to the line A/A of FIG. 1.

In FIGS. 1,2, a solar ventilator 1 is an integral unit for fitting to the downwardly/upwardly movable edge 2 of a window 3 or to any other suitable barrier's edge whether or not that barrier is a window or belongs to a motor car or other vehicle. Ventilator 1 has a housing 4 having an overhang 5 for mounting on edge 2. Housing 4 has an upwardly directed channel 6 for entering recess 7 in the adjacent frame (e.g. vehicle frame). First and second lateral extensions 8,9 are telescopically contained in the respective side edges of channel 6, so as to provide security of a wide variety of window sizes. Intermediate within channel 6 and between extensions 8,9 is a locking bar 10 for preventing extensions 8,9 from being forced back into channel 6. Housing 4 has a plurality of air flow slots 11 disposed within e.g. the motor car. Housing 4 has a longitudinal outlet 12 disposed outside the car. Within housing 4 is a centrally mounted rotary fan 13 driven by a motor 14 powered by a photovoltaic generator 15 arranged adjacent the inner face of window 3.

Figure 3:
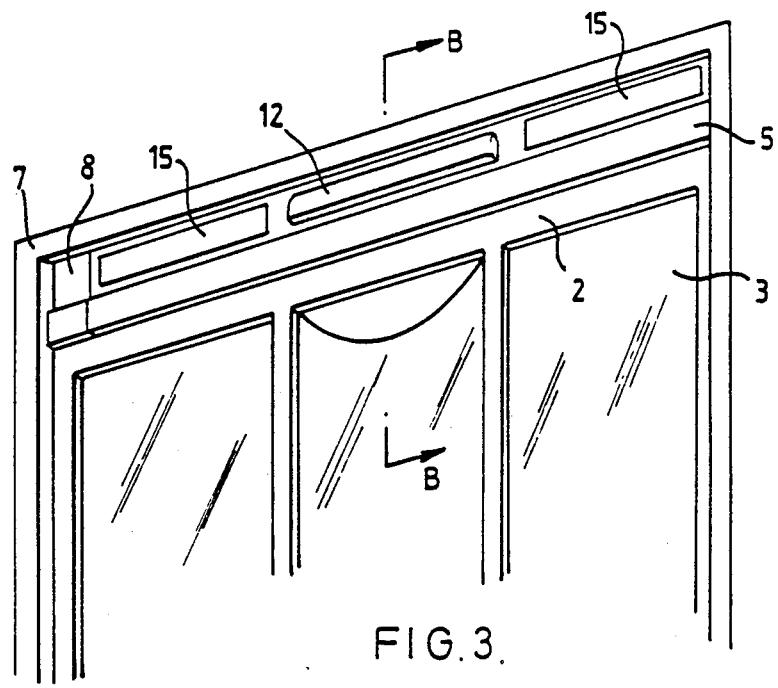
FIG. 3 is a perspective view of a solar ventilator applied to an opening window of a building.
Figure 4:
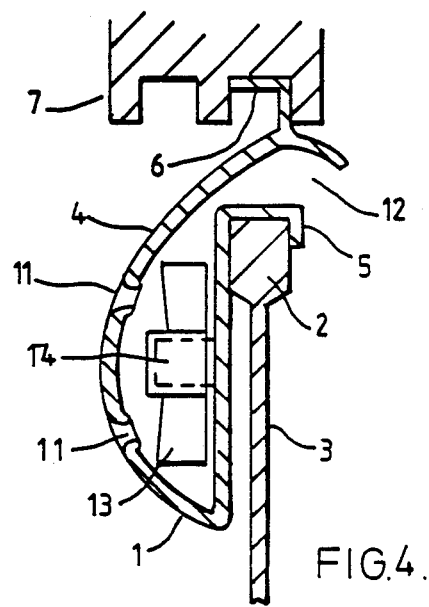
FIG. 4 is a cross sectional view corresponding to the line B/B of FIG. 3.
Figure 5:
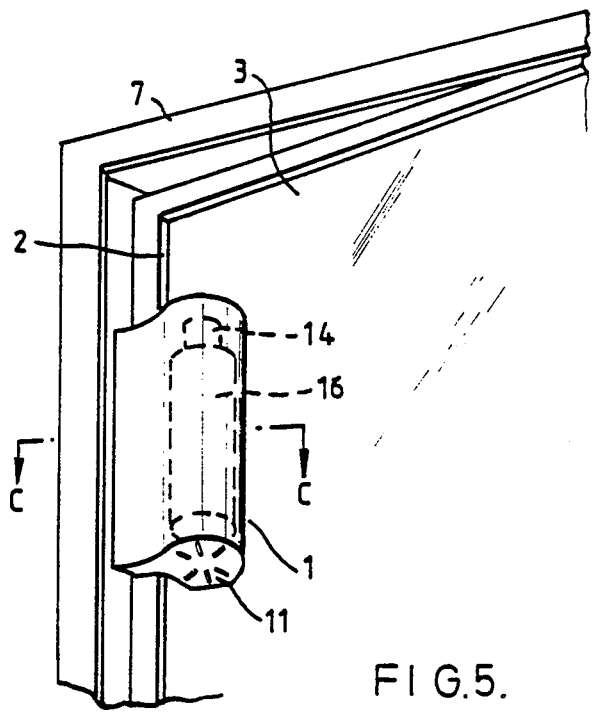
FIG. 5 is a perspective view of a solar ventilator applied to an opening window of a building.
Figure 6:
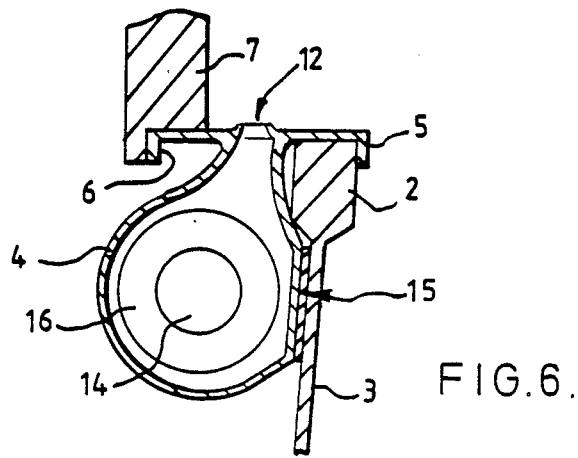
FIG. 6 is a cross sectional view corresponding to the line C/C of FIG. 5.

Referring to FIGS. 3,4, and to FIGS. 5,6, each solar ventilator 1 is an integral unit for fitting to the edge 2 of a respective opening window 3 of a building. Ventilator 1 of FIGS. 3,4 or FIGS. 5,6 has a respective housing 4 having an abutment or fitting 5 for mounting on window edge 2, and a further fitting 6 for mounting into window frame 7. Ventilators 1 may be securely applied to a variety of window sizes by one or more sliding extensions 8, or by cutting to length the suspension means 5,6. Airflow is through slots 11,12. In FIG. 4, housing 4 contains a rotary fan 13, which may be powered by motor 14. In FIG. 6, housing 4 contains a longitudinal fan 16, which may be powered by motor 14. In FIG. 3, a photovoltaic generator 15 is disposed outside relative to window 3. In FIG. 6, a photovoltaic generator 15 is disposed inside relative to window 3.

The solar ventilators 1 can be modified according to the description given above before the first reference to the drawings. For example, the outer ends 8a, 9a of extensions 8,9 can have a variety of profiles. In general, the present invention includes equivalents and modifications arising from all the disclosures within the present application. It will be appreciated that at least one photovoltaic generator may be disposed in any suitable manner(s), e.g. relative to inside or outside surface(s) of a window or the like. A further example would be to dispose at least one photovoltaic generator within a composite window structure or the like, e.g. between primary and secondary glazing panels of a double glazing window structure or within a laminated window.

We claim:

1. A solar ventilator for fitting to an edge of a member having first and second sides corresponding to first and second regions, the ventilator comprising:
   suspension means for suspending said ventilator from said edge so that said ventilator later will be adjacent to said first region;
   housing means having at least one inlet and at least one outlet, said one inlet being adapted to receive air from one of said regions, said one outlet being adapted to discharge to the other of said regions said received air;
   fan means comprised by said housing means so as to enable said reception and discharge of air; and
   solar generator means for driving said fan means in response to solar radiation;
   said suspension means comprising at least one extension means respectably adjustably projectable from at least one side of said suspension means.

2. A solar ventilator as claimed in claim 1, wherein at least one portion of said suspension means is adapted to engage at least one engaging portion of a barrier.

3. A solar ventilator as claimed in claim 1, wherein at least one portion of said suspension means is constituted by said housing means.

4. A solar ventilator as claimed in claim 5, wherein said housing means comprises at least one abutment for mounting on said edge.

5. A solar ventilator as claimed in claim 6, wherein said housing means comprises an overhang portion for acting as said abutment.

6. A solar ventilator as claimed in claim 4, wherein said housing means comprises at least one projection corresponding to at least one recess in a frame and the like, said at least one projection being receivable by said at least one recess.

7. A solar ventilator as claimed in claim 1, wherein said housing means contains said fan means.

8. A solar ventilator as claimed in claim 1, wherein said fan means is a rotary fan.

9. A solar ventilator as claimed in claim 1, wherein said solar generator means comprises at least one photovoltaic generator.

10. A solar ventilator as claimed in claim 9, wherein at least one said photovoltaic generator is a panel.

11. A solar ventilator as claimed in claim 1, said generator means includes means arranged and adapted for indirect reception of solar radiation.

12. A solar ventilator as claimed in claim 1 wherein said edge is an edge of a barrier having fitted thereto said solar generator means.

13. A solar ventilator as claimed in claim 12 wherein said edge is of a movable window of a motor vehicle.

* * * * *